United States Patent
Calleja

(10) Patent No.: US 7,059,573 B2
(45) Date of Patent: Jun. 13, 2006

(54) OFFSET BRACKET

(76) Inventor: Michael J. Calleja, 110 San Benito Rd., Brisbane, CA (US) 94005

( * ) Notice: Subject to any disclaimer, the term of this patent is extended or adjusted under 35 U.S.C. 154(b) by 0 days.

(21) Appl. No.: 11/180,927

(22) Filed: Jul. 13, 2005

(65) Prior Publication Data

US 2005/0258119 A1    Nov. 24, 2005

Related U.S. Application Data

(63) Continuation of application No. 10/612,210, filed on Jul. 2, 2003, now abandoned.

(51) Int. Cl.
*A47G 29/02* (2006.01)
(52) U.S. Cl. ........................ 248/235; 52/295
(58) Field of Classification Search ............ 248/235, 248/200, 207, 218.4, 219.1, 247, 300; 211/107, 211/192; 52/293.3, 295, 297, 298, 712; 403/232.1
See application file for complete search history.

(56) References Cited

U.S. PATENT DOCUMENTS

| | | | | |
|---|---|---|---|---|
| 2,321,221 A * | 6/1943 | Linehan | ...................... | 403/230 |
| 3,791,613 A * | 2/1974 | Nollen | ......................... | 248/49 |
| 3,863,900 A * | 2/1975 | Dagiel et al. | .................. | 256/59 |
| 4,199,908 A * | 4/1980 | Teeters | ........................ | 52/295 |
| 4,717,099 A * | 1/1988 | Hubbard | ..................... | 248/57 |
| 4,957,251 A * | 9/1990 | Hubbard | ..................... | 248/68.1 |
| 4,972,783 A * | 11/1990 | Crissman et al. | ........... | 108/107 |
| 4,981,225 A | 1/1991 | Cole | | |
| 5,110,074 A * | 5/1992 | Deguchi | ..................... | 248/340 |
| 5,170,829 A | 12/1992 | Duncan | | |
| 5,487,343 A * | 1/1996 | Phillips | ...................... | 108/57.2 |
| 5,534,665 A * | 7/1996 | Long | ......................... | 174/72 A |
| 5,573,125 A | 11/1996 | Denny | | |
| 5,624,045 A * | 4/1997 | Highsmith et al. | ......... | 211/192 |
| 5,984,121 A | 11/1999 | Cole | | |
| D448,650 S * | 10/2001 | Vrame | ........................ | D8/356 |
| 6,513,290 B1* | 2/2003 | Leek | ........................... | 52/295 |
| 6,585,122 B1 | 7/2003 | Calleja | | |
| 6,609,621 B1 | 8/2003 | Denny | | |
| 6,619,490 B1* | 9/2003 | Calleja | ........................ | 211/183 |
| 6,625,945 B1* | 9/2003 | Commins | .................. | 52/293.3 |
| 6,698,604 B1 | 3/2004 | Denny | | |
| 6,719,481 B1* | 4/2004 | Hoffmann | .................. | 403/403 |
| 6,722,512 B1 | 4/2004 | Scully | | |
| 6,776,298 B1* | 8/2004 | Courtwright | ................ | 211/191 |
| 2002/0144966 A1 | 10/2002 | Calleja | | |
| 2002/0148799 A1 | 10/2002 | Denny | | |
| 2005/0103736 A1* | 5/2005 | Calleja | ........................ | 211/189 |

FOREIGN PATENT DOCUMENTS

DE        10240999        * 7/2004

* cited by examiner

*Primary Examiner*—Anita M. King
(74) *Attorney, Agent, or Firm*—Robert Charles Hill

(57) ABSTRACT

A material-rack system comprises an offset safety netting, a perimeter cable suspension system for the netting, offset brackets to anchor the perimeter cable suspension system away by adjustable amounts, and vertical extension posts that bolt to the face of the upper frame parts of a pallet rack. The curtain netting is supported around its edges by attachments to taut wire ropes that are supported by the offset brackets. Such offset brackets slip over the vertical frame parts of the pallet rack. The brackets are always flush ended with the netting, and include several mounting points for the frame attachment.

6 Claims, 3 Drawing Sheets

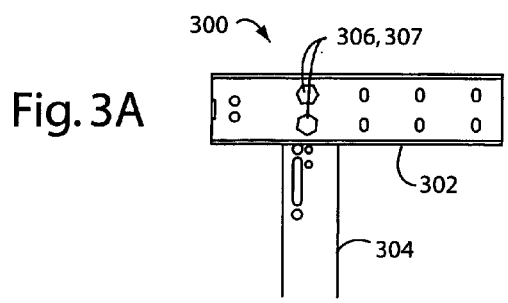
Fig. 3A
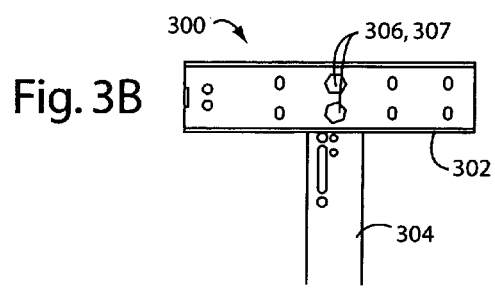
Fig. 3B
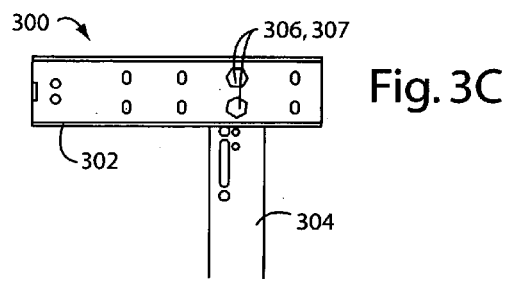
Fig. 3C
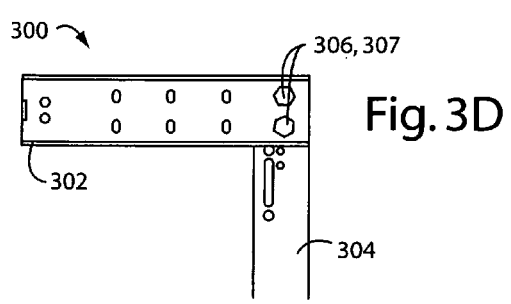
Fig. 3D
Fig. 3E    Fig. 3F
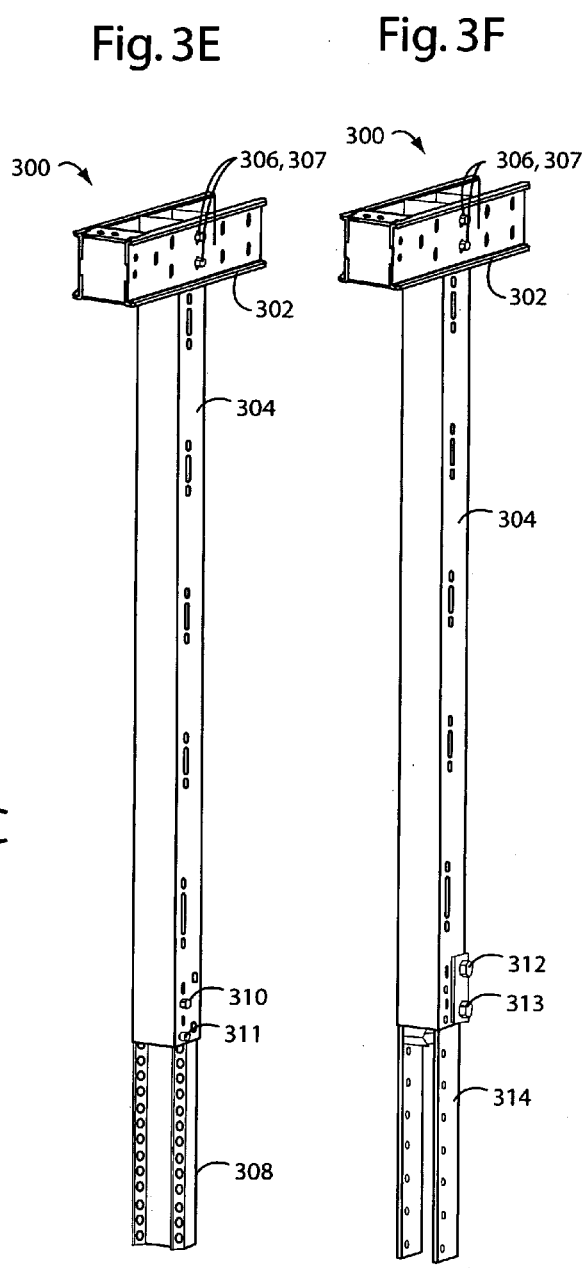

OFFSET BRACKET

RELATED APPLICATION

This application claims priority to and is a divisional application of U.S. Ser. No. 10/612,210 filed Jul. 2, 2003 now abandoned, entitled "Offset Pallet-Rack Safety Net System."

BACKGROUND OF THE INVENTION

1. Field of the Invention

The present invention relates to material-handling systems, and more particularly to safety netting systems that protect workers and customers in the aisles below pallet shelves.

2. Description of Related Art

Shelves and racks are a convenient way to store items, and can maximize floor space when palleted material is stored many levels high. A typical warehouse retail store, e.g., The Home Depot, has material racks that are two, three, and four levels high. Heavy items, like backup store inventory on a pallet, are placed and fetched from high above by a forklift. These heavy items can weigh anywhere from ten to two hundred pounds.

Heavy items placed 10–20 feet high above aisles in material racks and on shelves can present a significant and not-so-rare personal injury risk. Shaking, bumping, and poorly stacked items can come tumbling down and hurt people below, or at a minimum damage the product.

Not surprisingly, a number of different devices and methods have evolved to address these problems. The law too has entered the picture with OSHA regulations, and personal injury lawsuits. New company procedures, union work rules, and plain common sense now dictate that an effective restraint, barrier, or guard system be installed on the higher shelves and rack to prevent falling debris.

As could be expected, some methods and devices are better than others. Conventional safety products can be expensive to buy, and difficult to work with or install. A simple netting secured all around the shelf opening can be effective if the netting is strong enough and secured well. But the way the netting is secured and constructed can mean opening the net to access the shelf is made very difficult, in some cases requiring a technician to climb high above and use hand tools to open and/or close the net.

A universal safety net system for pallet racks is described by Barry Cole in U.S. Pat. No. 4,981,225, issued Jan. 1, 1991 (Cole '225). A framework intended to support pallets of heavy material is faced with a heavy duty netting that prevents accidental falls to the floor of loose material. Such netting is tied at its edges to a perimeter of taut suspension cables. In FIG. 4 of Cole '225, an offset configuration is shown where the netting is stood out a few inches away from the front of the pallet shelving framework. Such offset is implemented by lower and upper universal offset members 60 and 70.

Such prior art offset brackets are not adjustable in how far they offset the netting from the face of the pallet rack because they U-bolt to the front faces of the framing. The way these are attached to the framing further does not provide maximum rigidity to keep the netting cables taut.

SUMMARY OF THE INVENTION

Briefly, a material-rack safety-netting embodiment of the present invention comprises a safety netting, a perimeter cable suspension system for the netting, offset brackets to anchor the perimeter cable suspension system away by adjustable amounts, and vertical extension posts that bolt to the face of the upper frame parts of a pallet rack. The curtain netting is supported around its edges by attachments to taut wire ropes that are supported by the offset brackets. Such offset brackets slip over the vertical frame parts of the pallet rack. The brackets are always flush ended with the netting, and include several mounting points for the frame attachment.

In one embodiment, a choice of offsets of 3", 6", 9", and 12" is provided for the netting by different attachment points on the offset brackets.

An advantage of the present invention is that a safety netting is provided that does not get snagged by people or equipment in the aisle ways.

Another advantage of the present invention is that a safety netting is provided that is easy to install.

A further advantage of the present invention is that safety netting systems are provided that are simple to operate.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 3A–3F represent an assembled offset bracket system in which an offset bracket is attached to a vertical pallet rack extension. In FIG. 3A, the offset bracket is attached at its minimum offset position, wherein the front part where the netting attaches is at the left. In FIG. 3B, the offset bracket is at a next offset position. In FIG. 3C the offset bracket is attached at another more extreme offset position. In FIG. 3D, the offset bracket is at its most extreme offset position. In FIG. 3E, a perspective view diagrams the vertical pallet rack extension slipped over a front frame part of a pallet rack and is secured with bolts. In FIG. 3F, the vertical pallet rack extension is shown being secured with an alternative arrangement of bolts to a plate bar 314.

DETAILED DESCRIPTION OF THE INVENTION

Figure 1:
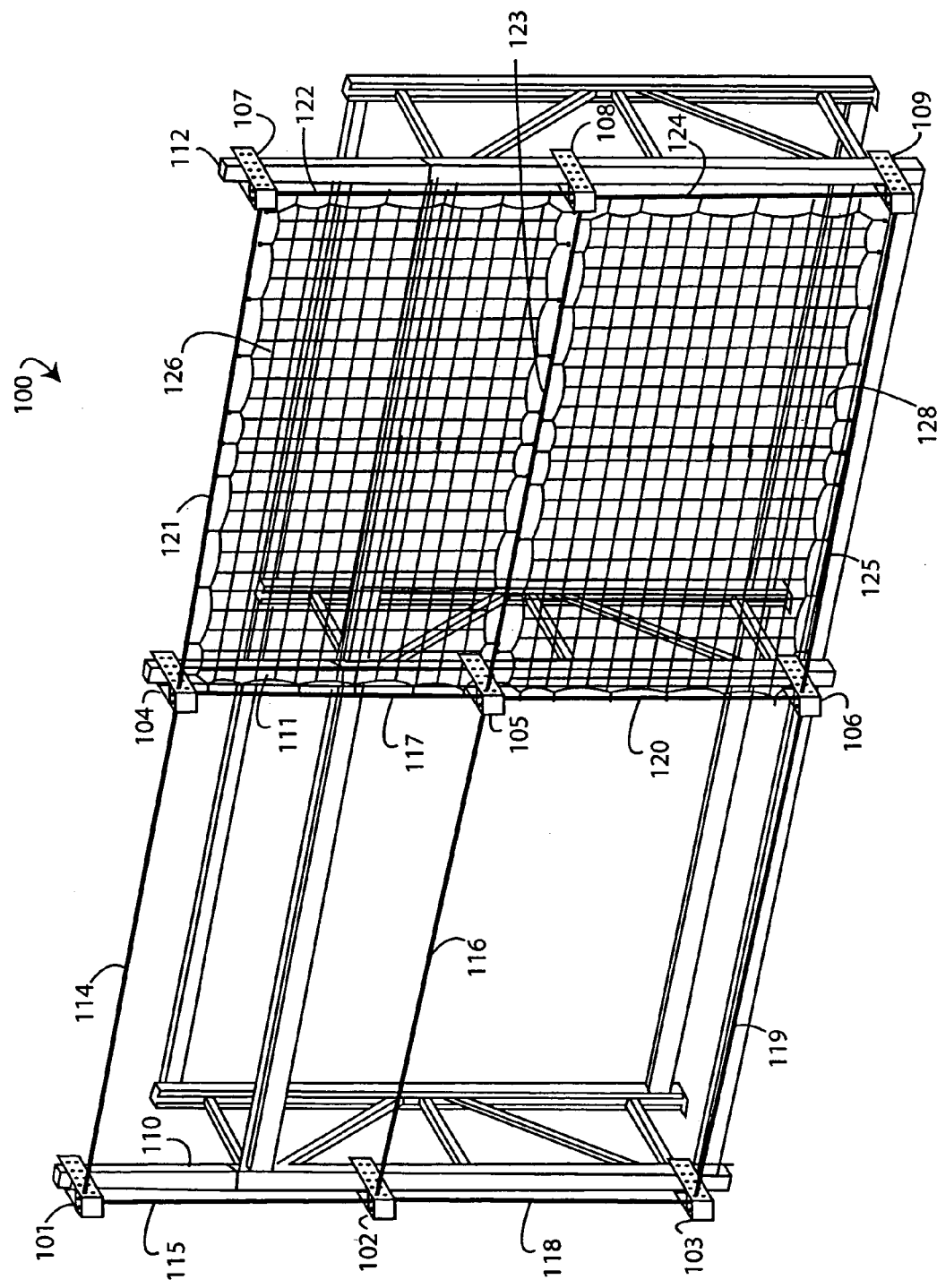
FIG. 1 is a perspective view of a safety netting system installed on a material rack shelving unit using offset brackets.

FIG. 1 illustrates a pallet-rack safety-netting system embodiment of the present invention, referred to herein by the reference numeral 100. The pallet-rack safety-netting system 100 comprises a number of extension brackets 101–109 that are bolted to three respective pallet rack vertical frame sections 110–112. A set of suspension cables 114–125 are strung taut between the offset brackets 101–109 and support safety nets at their perimeters. For example, a safety net 126 is suspended away from the pallet rack framing by vertical cables 117 and 122, and horizontal cables 121 and 123; and a safety net 128 is suspended between vertical cables 120 and 124, and horizontal cables 123 and 125. The nets can be attached to the cables every few inches by nylon cable ties or metal snap-hooks.

Embodiments of the present invention permit the safety nets to be positioned at a variety of clearances from the face of the pallet rack framing. Such clearance is needed when the pallets loaded on the pallet rack have oversized material on them. The netting itself is provided to protect people in the aisleways from heavy material that might fall off the pallets in the racks. The offset brackets can be attached to either vertical frame sections of the pallet rack or to extensions of the vertical frame sections.

Figure 2A:
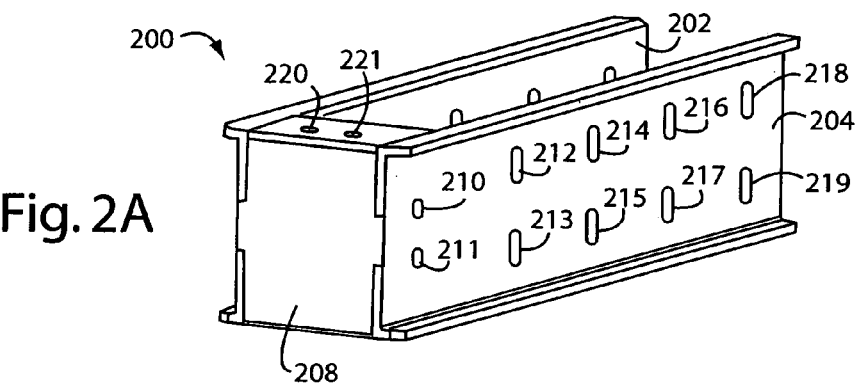
FIGS. 2A–2D are, respectively, perspective, top, end, and side view diagrams of an offset bracket like that used in the system of FIG. 1.
Figure 2B:
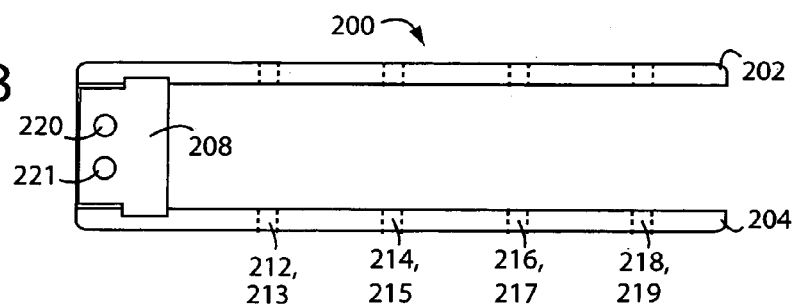
Figure 2C:
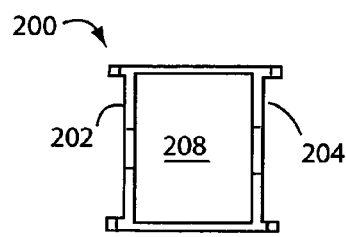
Figure 2D:
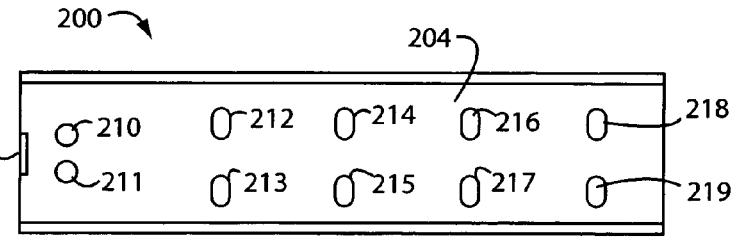

FIGS. 2A–2D represent an offset bracket embodiment of the present invention, and is referred to herein by the general reference numeral 200. The offset bracket 200 can be used for offset brackets 101–109, FIG. 1. The preferred construction is generally in the form of a U-channel open at one end, as can be seen in FIG. 2B. The open end slips around the vertical frame sections 110–112, FIG. 1, and is just wide enough to accommodate the width of the frame section. For example, 3" inside. A pair of bolts is used to secure each bracket on the pallet rack at particular heights above the floor.

The offset bracket 200 comprises a first arm 202, a second arm 204, and an end-plate 208. A typical height is 4" and a typical length is 15-⅝". Such form a box-section at the closed end and is very rigid and stiff so that the bracket can well-support and anchor the set of suspension cables 114–125 strung taut between the offset brackets 101–109, FIG. 1. The box section is suggested in the drawings as being separate steel sheetmetal pieces that interlock with tabs. Alternatively, the section could be welded.

Two horizontal suspension cables can be accommodated by a pair of right-side holes 210 and 211 and their counterparts on the left side of bracket 200. One could anchor and run left to support a netting on the left, and the other cable could anchor at the bracket and run to the right.

In the bracket 200 illustrated in FIGS. 2A–2D, there are four pairs of bolt holes 212–219 provided on the left and right arms for mounting the bracket to the vertical frame parts of a pallet rack. Only the ones on the right arm 204 are called out in FIGS. 2A–2D. Theses bolts holes 212–219 are horizontally spaced to provide a range of offset adjustments, e.g., 3", 6", 9", and 12". Other spacings are possible and will be dictated by the applications.

Two vertical suspension cables can be accommodated by a pair of top-side holes 220 and 221 and their counterparts on the bottom side of bracket 200. One could anchor and run up to support a netting above, and the other cable could anchor at the bracket and run down toward the floor.

The pairs of holes 210 and 211 for the horizontal suspension cables are offset slightly differently from the pairs of holes 220 and 221 for the vertical suspension cables, e.g., so the cables do not interfere at their points of criss-cross inside the box end of bracket 200.

FIGS. 3A–3F show an assembled offset bracket system 300 in which an offset bracket 302 is attached to a vertical pallet rack extension 304. In FIG. 3A, a pair of bolts 306 and 307 are used to attach the offset bracket 302 at its minimum offset position, e.g., 3" offset. The front part where the netting attaches is at the left. In FIG. 3B, bolts 306 and 307 attach the offset bracket 302 at a next offset position, e.g., 6", offset. In FIG. 3C, bolts 306 and 307 attach the offset bracket 302 at another more extreme offset position, e.g., 9" offset. In FIG. 3C, bolts 306 and 307 attach the offset bracket 302 at its most extreme offset position, e.g., 12" offset. In FIG. 3E, the vertical pallet rack extension 304 is shown slipping over a front frame part 308 of a pallet rack and is secured with bolts 310 and 311. In FIG. 3F, the vertical pallet rack extension 304 is shown being secured with an alternative arrangement of bolts 312 and 313 to a plate bar 314.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. An offset bracket for a pallet rack comprising:
a box end section;
a first set of anchor holes on both vertical sides of the box section that provide for horizontal ones of netting suspension cables;
a second set of anchor holes on both horizontal sides of the box section that provide for vertical netting suspension cables;
said first set of anchor holes offset slightly differently from said second set of anchor holes;
a pair of arms extending to form a U-channel from the box section; and
a plurality of attachment points disposed in the pair of arms that provide for a selection of distances with which a safety netting secured by the suspension cables is offset from a front face of said pallet rack.

2. An offset bracket, comprising:
an end section;
a first set of holes on both vertical sides of the end section;
a second set of holes on both horizontal sides of the end section;
said first set of holes offset slightly differently from said second set of holes;
a pair of arms extending to form a U-channel from the end section; and
a plurality of attachment points disposed in the pair of arms that provide for a selection of distances with which said offset bracket is secured.

3. The offset bracket of claim 2 wherein the offset bracket is secured at an offset of from 3" to 12".

4. The offset bracket of claim 3 wherein the offset bracket is secured in increments of 3 inches.

5. The offset bracket of claim 1 wherein the offset bracket is secured to said pallet rack at an offset of from 3" to 12".

6. The offset bracket of claim 5 wherein the offset bracket is secured to said pallet rack in increments of 3 inches.

* * * * *